United States Patent
Saito et al.

(10) Patent No.: US 8,834,321 B2
(45) Date of Patent: Sep. 16, 2014

(54) APPARATUS FOR CONTROLLING AUTOMATIC STOP AND RESTART OF ENGINE

(75) Inventors: Tatsuya Saito, Chiryu (JP); Takashi Satoh, Okazaki (JP); Satoru Mizuno, Okazaki (JP); Yosuke Ohmori, Kariya (JP); Masayoshi Takeda, Kariya (JP)

(73) Assignees: Denso Corporation, Kariya (JP); Advics Co., Ltd., Kariya (JP)

( * ) Notice: Subject to any disclaimer, the term of this patent is extended or adjusted under 35 U.S.C. 154(b) by 703 days.

(21) Appl. No.: 13/087,938

(22) Filed: Apr. 15, 2011

(65) Prior Publication Data

US 2011/0256981 A1 Oct. 20, 2011

(30) Foreign Application Priority Data

Apr. 15, 2010 (JP) ................................ 2010-094396

(51) Int. Cl.
| | |
|---|---|
| *B60W 10/06* | (2006.01) |
| *B60W 10/18* | (2012.01) |
| *B60W 30/192* | (2012.01) |
| *B60W 30/18* | (2012.01) |
| *F02N 11/08* | (2006.01) |
| *B60W 10/184* | (2012.01) |

(52) U.S. Cl.
CPC ............ *B60W 10/06* (2013.01); *B60W 30/192* (2013.01); *Y02T 10/48* (2013.01); *B60W 30/18072* (2013.01); *F02N 11/084* (2013.01); *F02N 2200/0805* (2013.01); *F02N 11/0833* (2013.01); *B60W 30/18136* (2013.01); *B60W 2510/0671* (2013.01); *B60W 2540/12* (2013.01); *B60W 10/184* (2013.01)
USPC .......................................................... 477/183

(58) Field of Classification Search
USPC ........................................................ 477/183
See application file for complete search history.

(56) References Cited

U.S. PATENT DOCUMENTS

| | | | |
|---|---|---|---|
| 6,702,718 | B2 | 3/2004 | Tani et al. |
| 6,754,579 | B2 | 6/2004 | Kamiya et al. |

FOREIGN PATENT DOCUMENTS

| | | |
|---|---|---|
| JP | A-2002-221059 | 8/2002 |
| JP | A-2009-063001 | 3/2009 |

OTHER PUBLICATIONS

Office Action issued in Chinese Patent Application No. 201110141737.1 dated Aug. 26, 2013 (with translation).

*Primary Examiner* — Erin D Bishop
(74) *Attorney, Agent, or Firm* — Oliff PLC (57) ABSTRACT

An apparatus for controlling automatic stop/restart of an engine, includes: an automatic-stop/restart-control-unit which stops/restarts the engine; a brake-pressure-detection-unit which detects brake pressure in a brake system and controls the brake pressure to perform anti-skid control; a first-determination-unit which determines whether the brake pressure is not less than a first-threshold; a second-determination-unit which determines whether the brake pressure is not less than a second-threshold larger than the-first threshold; a stop-allowing-unit which allows the automatic-stop/restart-control-unit to stop the engine while the engine operates, when the first-determination-unit determines that the brake pressure is not less than the first-threshold and the second-determination-unit determines that the brake pressure is less than the second-threshold; and a stop-inhibiting-unit which inhibits the automatic-stop/restart-control-unit from stopping the engine while the engine operates, when the first-determination-unit determines that the brake pressure is less than the first-threshold and the second-determination-unit determines that the brake pressure is not less than the second-threshold.

11 Claims, 6 Drawing Sheets

APPARATUS FOR CONTROLLING AUTOMATIC STOP AND RESTART OF ENGINE

CROSS-REFERENCE TO RELATED APPLICATION

This application is based on and claims the benefit of priority from earlier Japanese Patent Application No. 2010-094396 filed Apr. 15, 2010, the description of which is incorporated herein by reference.

BACKGROUND OF THE INVENTION

1. Technical Field of the Invention

The present invention relates to an apparatus for controlling automatic stop and restart of an engine. The apparatus performs idle stop control (hereinafter referred to as "IS control") under which an engine (internal combustion engine), i.e. a drive source of travel, is stopped when predetermined conditions are met to perform idle stop.

2. Related Art

As disclosed in JP-A-2009-063001, an apparatus for controlling automatic stop and restart of an engine has been known, which can reduce fuel consumption. This apparatus performs idle stop when an engine stop allowance condition, that is, the fact that the brake pressure has exceeded a predetermined threshold, has been met. Thus, when a brake pressure has exceeded a predetermined threshold, the driver is determined as having an intention of stopping the vehicle, which is followed by performing IS control for the reduction of fuel consumption.

However, in the case where the engine is configured to stop under

IS control when the vehicle is decelerated as well, the engine may be stopped in a vehicle speed region in which the control using an anti-skid braking system (ABS) (hereinafter referred to as "ABS control" or "anti-skid control") is performed. Therefore, when the fact that the brake pressure has exceeded a predetermined threshold is used as an engine stop allowance condition, the engine will be stopped in the state where the brake pressure exceeding the threshold is applied.

It has been confirmed that performing engine stop in the state where a brake pressure exceeding a threshold is applied may cause a problem that controllability of ABS control is deteriorated. For example, ABS control may be started according to the change of the friction coefficient of a road surface (hereinafter referred to as "road surface μ"). At the same time, an engine operation request may also be issued from the alternator or the compressor of an air conditioner, which are actuated by the engine. In other words, an engine restart request, which is not intended by the driver, may be issued at the same time. If the engine is restarted based on such an engine restart request, battery voltage may be lowered by the restart. In the event a high brake pressure has been applied when the battery voltage is lowered, pump load may become extremely large, affecting the operation of the motor for ABS control. As a result, controllability of ABS control will not be ensured any more.

SUMMARY OF THE INVENTION

An embodiment provides an apparatus for controlling automatic stop and restart of an engine. The apparatus can ensure controllability of ABS control. The controllability would have otherwise been deteriorated due to the lowering of power voltage, which is caused by restarting the engine in the state where a high brake pressure is applied.

As an aspect of the embodiment, an apparatus for controlling automatic stop and restart of an engine of a vehicle includes: an automatic stop and restart control unit which stops and restarts the engine; a brake pressure detection unit which detects brake pressure in a brake system, which generates the brake pressure in response to brake manipulation to cause a braking force for wheels, and controls the brake pressure to perform anti-skid control; a first determination unit which determines whether or not the brake pressure detected by the brake pressure detection unit is equal to or more than a first threshold; a second determination unit which determines whether or not the brake pressure detected by the brake pressure detection unit is equal to or more than a second threshold which is larger than the first threshold; a stop allowing unit which allows the automatic stop and restart control unit to stop the engine while the engine is in operation, when the first determination unit determines that the brake pressure is equal to or more than the first threshold and the second determination unit determines that the brake pressure is less than the second threshold; and a stop inhibiting unit which inhibits the automatic stop and restart control unit from stopping the engine while the engine is in operation, when the first determination unit determines that the brake pressure is less than the first threshold and the second determination unit determines that the brake pressure is equal to or more than the second threshold.

DETAILED DESCRIPTION OF THE PREFERRED EMBODIMENTS

With reference to the accompanying drawings, hereinafter is described an embodiment of the present invention. It should be appreciated that, throughout the specification and the drawings, identical or uniform components are designated with the same references.

Figure 1:
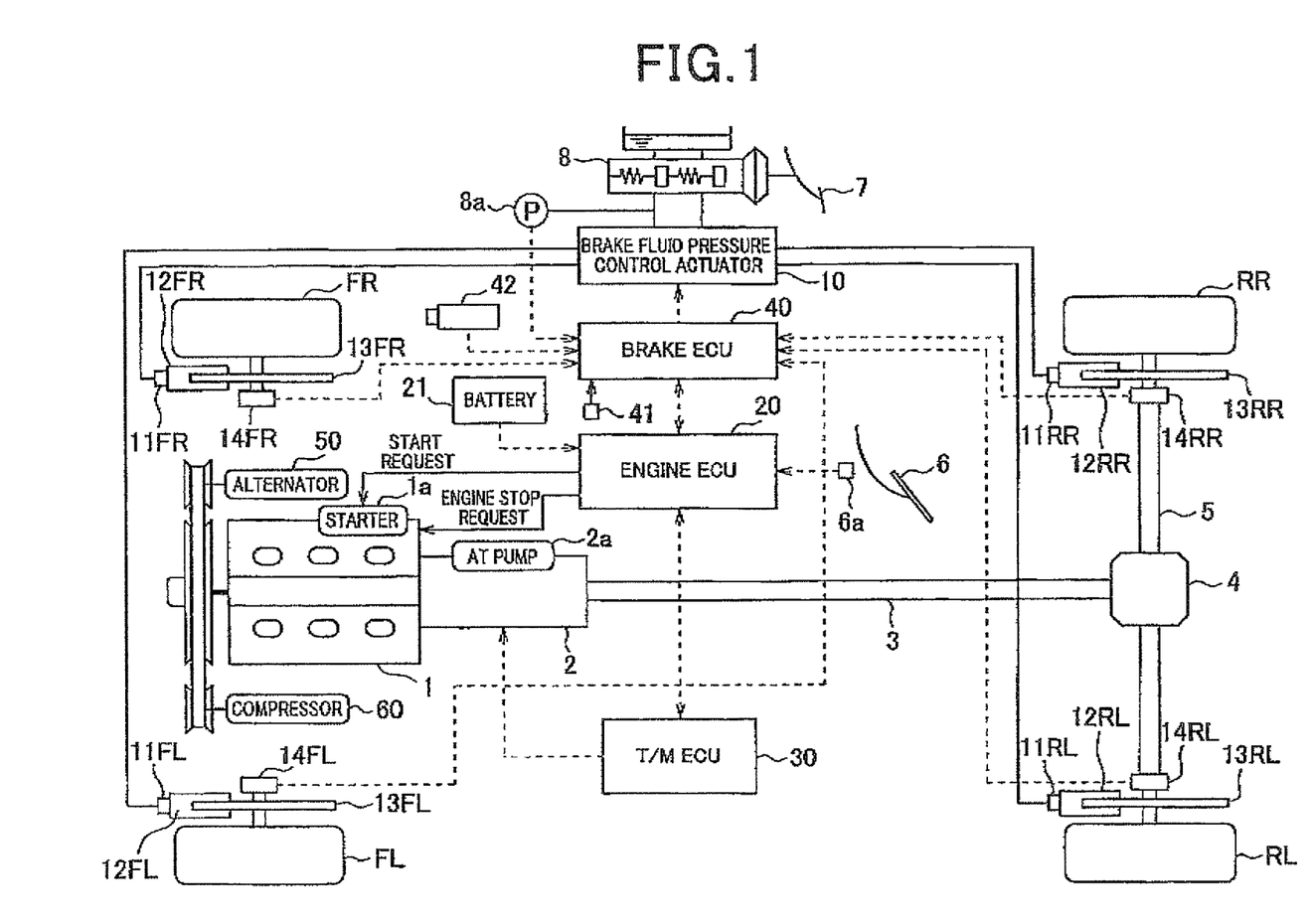
FIG. 1 is a diagram illustrating a general configuration of a vehicle control system applied with an apparatus for controlling automatic stop and restart of an engine for performing idle stop control (IS control), according to an embodiment of the present invention.

FIG. 1 is a diagram illustrating the general configuration of a vehicle control system to which an apparatus for controlling automatic stop and restart of an engine for performing idle stop control (IS control), according to the embodiment of the present invention is applied.

Specifically, the apparatus is applied to an FR (front-engine rear-wheel drive) vehicle, in which an engine is installed in the front, and RR (rear-right) and RL (rear-left) wheels are used as drive wheels. However, in a similar manner, the apparatus may be applied, for example, to an FF (front-engine front-wheel drive) vehicle that uses FR (front-right) and FL (front-left) wheels as drive wheels.

Figure 3:
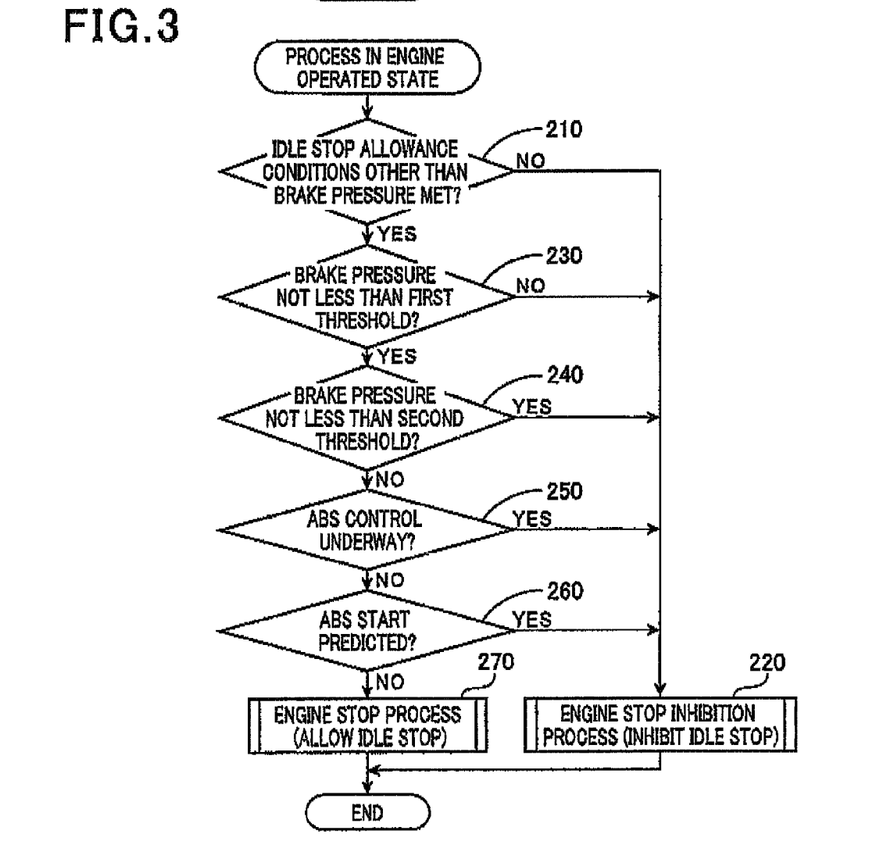
FIG. 3 is a flow diagram illustrating a process in an engine operated state of FIG. 2.

As shown in FIG. 3., a drive system of the FR vehicle includes such components as an engine 1, a transmission 2, a propeller shaft 3, a differential gear 4, a drive shaft 5 and an accelerator pedal 6, Drive force is transmitted to rear wheels RR (rear-right) and RL (rear-left), which serve as drive wheels, via these components. Specifically, an engine output (engine torque) generated based on a manipulated variable of the accelerator pedal 6 is transmitted to the transmission 2. The transmitted engine output is then subjected to conversion based on a gear ratio corresponding to a gear position set by the transmission 2. Then, the converted engine output is transmitted to the propeller shaft 3 as a drive force. The drive force is then transmitted to the rear wheels RR and RL via the drive shaft 5 connected to the propeller shaft 3 via the differential gear 4.

A brake system of the FR vehicle includes a brake pedal 7, a master cylinder (M/C) 8 and a brake booster 9. The brake system generates a brake fluid pressure in the master cylinder 8 in response to a manipulated variable of the brake pedal 7 and transmits the brake fluid pressure to the wheels FR, FL, RR and RL to cause a braking force.

The brake system also includes an actuator 10 for controlling brake fluid pressure (hereinafter also just referred to as "actuator 10"), as well as wheel cylinders 11FR, 11FL, 11RR and 11RL, calipers 12FR, 12FL, 12RR and 12RL, and disc rotors 13FR, 13FL, 13RR and 13RL, which are provided to the wheels FR, FL, RR and RL, respectively. A brake fluid pressure applied to the wheel cylinders 11FR, 11FL, 11RR and 11RL (this pressure is hereinafter referred to as "W/C pressure") is controlled by the actuator 10. Meanwhile, the calipers 12FR, 12FL, 12RR and 12RL are provided with respective brake pads which press/hold the respective disc rotors 13FR, 13FL, 13RR and 13RL. Under the control of the actuator 10, the holding/pressing force of the individual brake pads is adjusted to thereby control the braking force of the wheels FR, FL, RR and RL.

For example, the actuator 10 is configured by various control valves for intensifying, retaining or reducing pressure of the wheel cylinders 11FR, 11FL, 11RR and 11RL, a reservoir for accommodating brake fluid in the wheel cylinders 11FR, 11FL, 11RR and 11RL when the pressure of the wheel cylinders is reduced, a pump for returning the brake fluid accommodated in the reservoir to the side of the master cylinder 8 and a motor for actuating the pump.

When braking is normally applied with this configuration, the actuator 10 allows the master cylinder 8 to be connected to the wheel cylinders 11FR, 11FL, 11RR and 11RL, so that a braking force equivalent to the manipulated variable (amount of stroke or pedal pressure) of the brake pedal 7 is caused in the wheels FR, FL, RR and RL.

When a slip ratio of each of the wheels FR, FL, RR and RL exceeds an ABS control start threshold, control using an anti-skid control system (ABS) (hereinafter referred to as "ABS control") is started to control the W/C pressure to thereby avoid the tendency of locking. Specifically, under ABS control, the various control valves are driven, while a motor is driven to actuate a pump, so that the Wit pressure is intensified, retained or reduced. In this way, the slip ratio of each of the wheels FR, FL, RR and RL is controlled to be a desired level, whereby the tendency of locking is avoided.

The vehicle control system of the present embodiment also includes an engine controller 20 (hereinafter referred to as "engine ECU 20") and a transmission controller 30 (hereinafter referred to as "T/M ECU 30") for controlling the drive system, as well as a brake controller 40 (hereinafter referred to as "brake ECU 40") for controlling the brake system.

The engine ECU 20 basically performs control of the engine 1. In the present embodiment, however, the engine ECU 20 also has a function of performing idle stop control (hereinafter referred to as "IS control"). In the present embodiment, the engine ECU 20 is integrated with the brake ECU 40, which will be described later, to configure the apparatus for controlling automatic stop and restart of an engine.

The engine ECU 20 is configured by a well-known microcomputer that includes a CPU, a ROM, a RAM and an I/O. The engine ECU 20 performs various calculations and processes according to a program stored such as in the ROM to control the engine output (engine torque) and to thereby control the drive force generated in the rear wheels RR and RL.

For example, the engine ECU 20 inputs a manipulated variable of the accelerator pedal 6 with a detection signal of a pedal sensor 6a and regulates a fuel injection device based on the manipulated variable of the accelerator pedal 6 to thereby regulate the fuel injection quantity. Thus, the engine output is controlled to thereby control the drive force.

Also, in the present embodiment, the engine ECU 20 also performs IS control. Thus, the engine ECU 20 outputs an engine stop request to the engine 1, while outputting an engine start request to a starter 1a. The engine stop request and the engine start request are each outputted when various conditions are met The various conditions will be described later.

Further, the engine ECU 20 inputs a request for starting an AT (automatic transmission) pump 2a (hereinafter referred to as "AT pump start request") from the TIM ECU 30, while inputting brake/vehicle speed information from the brake ECU 40. The AT pump 2a has a function of driving the transmission 2 which is driven when the engine 1 is driven. When the AT pump 2a is driven, the engine 1 is necessarily required to be driven. Therefore, it is ensured that the AT pump start request is outputted from the T/M ECU 30 to the engine ECU 20, so that a start request for the engine 1 is outputted via the engine ECU 20.

In addition, as conditions for outputting an engine stop request under IS control, the engine ECU 20 uses information on brake pressure and information on whether or not ABS control is performed, as well as information on vehicle speed, as will be described later. Accordingly, brake information, which is information on brake pressure and information on whether or not ABS control is performed, as well as information on vehicle speed, is transmitted from the brake ECU 40 to the engine ECU 20 for use under IS control.

The engine ECU 20 inputs information associated with the voltage of a battery 21 (battery voltage). The battery voltage is also used as a condition for outputting an engine start request under IS control. Accordingly, the information on the battery voltage is ensured to be inputted to the engine ECU 20 for use under IS control.

The T/M ECU 30 is configured by a well-known microcomputer that includes a CPU, a ROM, a RAM and an I/O. The T/M ECU 30 performs various calculations and processes according to a program stored such as in the ROM to make a selection, for example, of a gear position of the transmission 2.

The T/M ECU 30 exchanges information with the engine ECU 20 to transmit the gear position of the transmission 2 to the engine ECU 20, Thus, the engine ECU 20 calculates an engine output, taking into account the gear position of the transmission 2 in the information transmitted from the TIM ECU 30 in addition to the manipulated variable of the accelerator pedal 6. Also, the T/M ECU 30 outputs an AT pump start request when actuating the AT pump 2a and informs the engine ECU 20 accordingly.

The brake ECU 40 is configured by a well-known microcomputer that includes a CPU, a ROM, a RAM and an I/O. The brake ECU 40 performs various calculations and processes according to a program stored such as in the ROM to cause optional braking force to the individual wheels FR, FL, RR and RL.

The brake ECU 40 also performs various calculations based on detection signals from various sensors. For example, the brake ECU 40 allows a pressure sensor 8a to detect a pressure in the master cylinder 8 (this pressure in the master cylinder 8 is hereinafter referred to as "M/C pressure"), The M/C pressure is generated in response to the manipulated variable of the brake pedal 7. Then, the brake ECU 40 performs temporal differentiation of the M/C pressure to thereby calculate a rate of brake pressure change.

Also, the brake ECU 40 inputs a detection signal of a forward/backward acceleration (hereinafter referred to as "forward/backward G") sensor 41 to calculate a vehicle deceleration based on the detection signal of the frontward/backward G sensor 41.

Further, the brake ECU 40 identifies, using a well-known method, the temperature on a road and the type of a road surface (e.g., asphalt road surface, concrete road surface, snow-covered road surface or frozen road surface) based on an image picked up by an on-vehicle camera 42 to detect the change of the friction coefficient of a road surface (hereinafter referred to as "road surface $\mu$").

Further, the brake ECU 40 receives detection signals from wheel speed sensors 14FR, 14FL, 14RR and 14RL provided at the wheels FR, FL, RR and RL, respectively, to calculate wheel speeds of the individual wheels. At the same time, the brake ECU 40 calculates an estimated vehicle speed (hereinafter just referred to as "vehicle speed") based on the calculated wheel speeds, using a well-known method. In addition, the brake ECU 40 calculates a slip ratio of each of the wheels FR, FL, RR and RL by dividing the difference between a vehicle speed and each wheel speed by the vehicle speed, using a well-known method. When the slip ratio exceeds a start threshold for starting ABS control, the brake ECU 40 outputs a control signal to the actuator 10 for controlling brake fluid pressure to control the WiC pressure caused in the wheels cylinders 11FR, 11FL, 11RR and 11RL of the respective wheels to be controlled. As a result, braking force of the wheels is controlled to thereby avoid the tendency of locking.

Although not specifically illustrated in FIG. 1, it is so configured that other start requests, including the AT pump start request, are inputted to the engine ECU 20 from various ECUs, The start requests are different from those based on brake pressure.

Specifically, when a device actuated by the engine 1 is used, the engine 1 has to be restarted. In this case, a start request from an ECU that controls the device in question is inputted to the engine ECU 20. For example, as shown in FIG. 1, an alternator 50 actuated for charging the battery 21 and a compressor 60 actuated in using an air conditioner are actuated by the engine 1. Accordingly, the engine 1 has to be restarted when the alternator 50 or the compressor 60 is actuated. Therefore, for example, a start request is outputted from a power supply ECU that controls the alternator 50 or an air conditioner ECU that controls the air conditioner. Thus, it is ensured that start requests besides the start requests based on brake pressure are inputted to the engine ECU 20.

The vehicle control system is configured as described above, being provided with the apparatus for controlling automatic stop and restart of an engine. The apparatus performs IS control.

Figure 2:
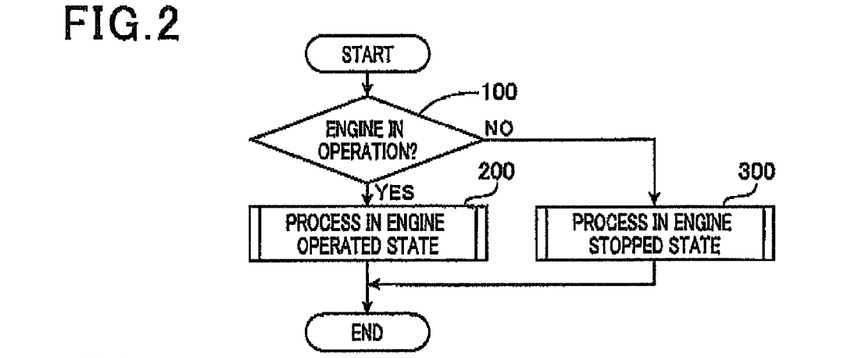
FIG. 2 is a flow diagram illustrating an IS control process performed by an engine ECU.
Figure 4:
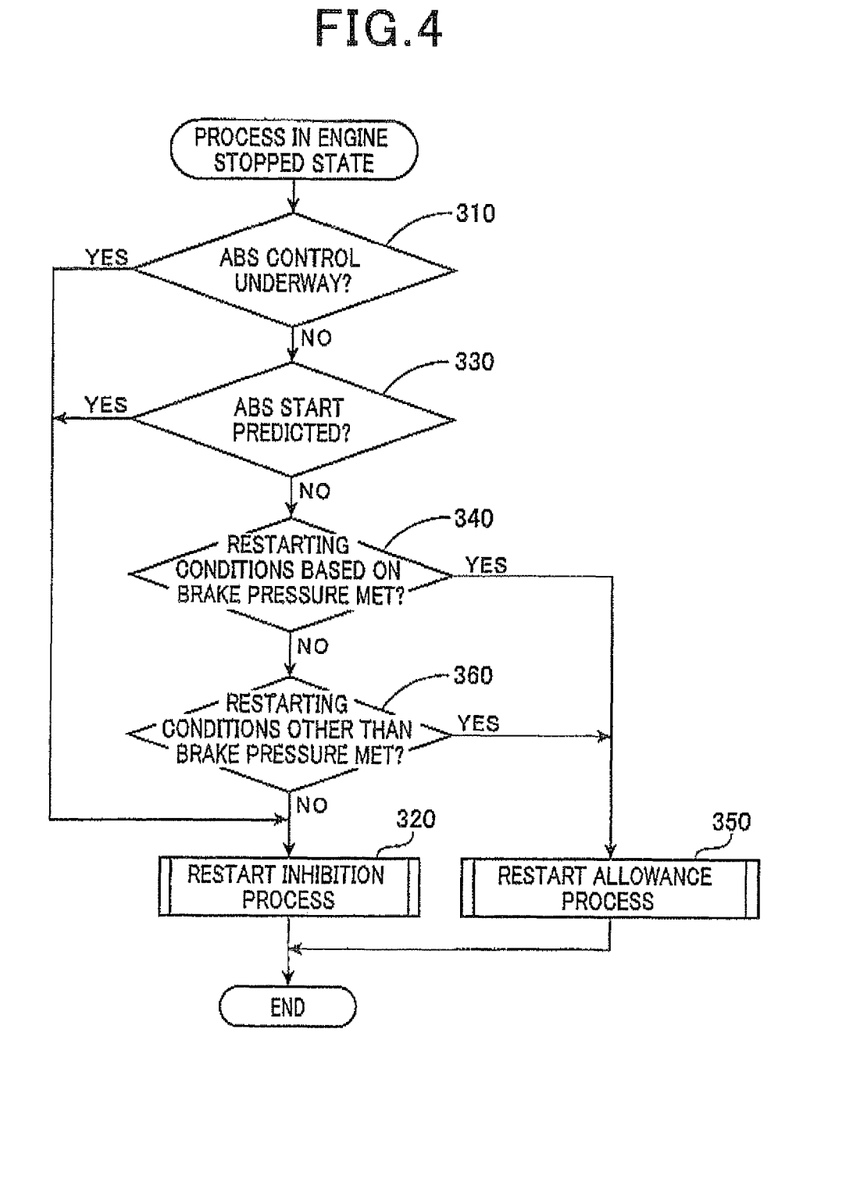
FIG. 4 is a flow diagram illustrating a process in an engine stopped state of FIG. 2.

Referring now to FIGS. 2 to 4, hereinafter is described IS control performed by the vehicle control system of the present embodiment.

FIGS. 2 to 4 are flow diagrams illustrating processes of IS control performed by the engine ECU 20 of the present embodiment, which functions as the apparatus for controlling automatic stop and restart of an engine. The processes illustrated in these figures are performed at a predetermined control cycle when an ignition switch, not shown, is turned on.

First, in step 100, it is determined whether or not an engine is in operation. The engine 1 is in a stopped state when, with the ignition switch being in an on-state, the engine ECU 20 has outputted an engine stop request to stop the engine 1 and when, thereafter, the engine 1 has not been restarted with the output of a start request. Also, when the engine speed is equal to or more than a predetermined engine speed that is estimated as indicating idling, the engine 1 is in operation. Since the engine ECU 20 itself deals with these pieces of information, the engine ECU 20 can determine whether or not the engine is in operation based on any one of these pieces of information.

Then, when an affirmative determination is made in step 100, control proceeds to step 200 where a process in an engine operated state is performed. When a negative determination is made in step 100, control proceeds to step 300 where a process in an engine stopped state is performed.

FIG. 3 is a flow diagram illustrating the process in an engine operated state. Referring to FIG. 3, the process in an engine operated state is explained.

First, in step 210, it is determined whether or not idle stop allowance conditions other than brake pressure have been met. The "idle stop allowance conditions other than brake pressure" refers to those conditions which are determined as conditions for allowing idle stop. For example, the idle stop allowance conditions other than brake pressure include that the accelerator pedal is released and the vehicle speed is equal to or less than a predetermined speed (e.g., 10 km/h), and that the battery voltage is maintained (battery voltage is equal to or more than a threshold).

The condition that the accelerator pedal is released and the vehicle speed is equal to or less than a predetermined speed means that the driver intends to stop the vehicle. The state of the accelerator pedal being released is detected based on a detection signal from the pedal sensor 6a, which detect the manipulated variable of the accelerator pedal 6. The vehicle speed is acquired from the brake ECU 40. Idle stop is performed when the driver stops the vehicle to improve fuel consumption. Therefore, it is not preferable to perform idle stop when the vehicle will not be stopped but will continue traveling without being stopped. This is the reason for making it a condition that the accelerator pedal is released and the vehicle speed is equal to or less than a predetermined speed.

The condition that the battery voltage is maintained means that, when idle stop is performed, the vehicle is not in a state where the engine ECU 20 has to restart the engine 1 for the recovery of the battery voltage. In other words, when the battery voltage has been decreased, a start request is likely to be outputted to actuate the alternator 50, and thus the engine 1 is likely to be restarted. In this case, the controllability of ABS control may no longer be ensured. This is the reason for making it a condition that the battery voltage is maintained. Whether or not the voltage of the battery 21 is maintained is determined by determining whether or not the voltage of the battery 21 is equal to or more than a threshold.

When a negative determination is made in step 210, it is not the timing for performing idle stop and thus control proceeds to step 220. In step 220, an engine stop inhibition process is performed to inhibit idle stop and the process of the present control cycle is ended. In this way, idle stop is inhibited when the vehicle has a probability of traveling without being stopped as in the cases where the accelerator pedal is pressed or where the vehicle speed exceeds a predetermined speed. Idle stop is also inhibited in the case where battery voltage is not ensured. Specifically, idle stop is also inhibited in the case where, for example, the engine 1 is restarted in an idle stop mode, based on the conditions other than those based on the brake pressure.

On the other hand, when an affirmative determination is made in step 210, control proceeds to step 230 to determine whether or not the brake pressure is equal to or more than a first threshold. The first threshold corresponds to a threshold that allows idle stop. Specifically, the first threshold is set to a level of a brake pressure for decelerating the vehicle. At the level, the driver is regarded to have an intention of applying braking.

The brake pressure here refers to the W/C pressure. However, since ABS control is not underway, the brake pressure may be the M/C pressure which is calculated by the brake ECU 40, The brake ECU 40 calculates the M/C pressure based on a detection signal of the pressure sensor 8a provided in the actuator 10. It is so configured that the result of the calculation is transmitted to the engine ECU 20 from the brake ECU 40 to thereby transmit the M/C pressure to the engine ECU 20. Although the W/C pressure, itself, is not detected here, the WIC pressure may be detected by providing pressure sensors to the respective wheel cylinders 11FR, 11FL, 11RR and 11RL.

When an affirmative determination is made in step 230, control proceeds to step 240. If a negative determination is made in step 230, control proceeds to step 220 to perform the engine stop inhibition process mentioned above and ends the present process.

In step 240, it is determined whether or not the brake pressure is equal to or more than a second threshold. The second threshold is set to a value higher than the first threshold. Specifically, when the idle stop allowance conditions are met and idle stop is performed, the engine 1 may be restarted by some sort of start request and thus the battery voltage may be lowered. The second threshold is set to a level of a brake pressure. At the level, the controllability of ABS control is unlikely to be ensured due to lowering of battery voltage.

For example, under the conditions where a brake pressure equal to or more than the second threshold is applied, idle stop may be performed, followed by ABS control. In this case, the engine 1 will be restarted and thus the battery voltage is lowered. Due to the lowering of battery voltage, the operation of the motor used for ABS control may be affected by the undue pump load caused by the application of high brake pressure. As a result, controllability of ABS control may no longer be ensured. Therefore, when there is such a probability, an affirmative determination is made in step 240 and control proceeds to step 220 to perform the engine stop inhibition process mentioned above and ends the present process.

When a negative determination is made at step 240, control proceeds to step 250. In step 250, it is determined whether or not ABS control is underway. This determination on ABS control is made based on the information regarding whether or not ABS control is underway included in the brake information transmitted from the brake ECU 40. For example, when the conditions for starting ABS control are met, the brake ECU 40 is ensured to set up a flag indicating that ABS control is underway. This flag is set up until the vehicle is stopped or the brake pedal is released. The information that ABS control is underway is transmitted to the engine ECU 20 while the flag of ABS control is set up. If the flag has been reset, the engine ECU 20 is transmitted with the information that ABS control is not underway.

If some sort of start request has been issued while ABS control is underway and thus restart of the engine 1 is necessitated, the ABS control currently performed may not be performed with good controllability. Therefore, while ABS control is underway, it is preferable that ABS control is permitted to have priority over idle stop. Accordingly, when an affirmative determination is made in step 250, control proceeds to step 220 to inhibit idle stop. When a negative determination is made in step 250, control proceeds to step 260.

In step 260, the probability of ABS start is predicted. This prediction is made based on an ABS start-predicted flag which is set up based on the results of an ABS start prediction process described later.

When the ABS start-predicted flag has been reset, a negative determination is made in step 260 and control proceeds to step 270. When the ABS start-predicted flag has been set up, an affirmative determination is made in step 260 and control proceeds to step 220 to inhibit idle stop. In this way, idle stop is inhibited when ABS control is underway or when ABS start is predicted to be performed. Then, idle stop is allowed again when ABS control has been finished or when the conditions of ABS start prediction have been escaped.

In step 270, an engine stop process is performed to allow idle stop and then the process of the present control cycle is ended. In this way, an engine stop request is outputted from the engine ECU 20, so that the engine 1 is stopped. As a result, the fuel injection device is regulated to set fuel injection quantity to zero, thereby improving fuel consumption. Then, the process in an engine operated state is completed.

FIG. 4 is a flow diagram illustrating a process in an engine stopped state. Referring to FIG. 4, hereinafter is described the process in an engine stopped state.

In step 310, it is determined whether or not ABS control is underway. This determination is made in a similar way to step 250 of FIG. 3 described above. If an affirmative determination is made in step, 310, control proceeds to step 320 to perform a restart inhibition process, by which deterioration in the controllability of ABS control is suppressed. Specifically, due to the lowering of battery voltage by restarting the engine 1, the operation of the motor used for ABS control may be affected, As a result, controllability of ABS control may no longer be ensured. The restart inhibition process is performed for this reason while ABS control is underway to thereby inhibit restart of the engine 1.

When a negative determination is made in step 310, control proceeds to step 330 to predict the probability of ABS start. This prediction is made in a similar way to step 260 of FIG. 3 described above. When an affirmative determination is made in step 330, there is a probability of performing ABS control and thus control proceeds to step 320 to perform the restart inhibition process described above. Thus, in the case where there is a probability of performing ABS control as well, controllability of ABS control is ensued. The controllability may otherwise have been deteriorated due to the lowering of battery voltage that accompanies restart of the engine 1. Specifically, restart of the engine 1 is inhibited when ABS control is underway or when ABS start has been predicted. Restart of the engine 1 is allowed again when ABS control has been finished or when the conditions of ABS start prediction have been escaped.

On the other hand, when a negative determination is made in step 330, control proceeds to step 340 where it is determined whether or not restart conditions based on brake pressure have been met. The term "restart conditions based on brake pressure" refers to that the brake pressure has been decreased by the driver's release of the brake pedal 7, or by the driver's loosening the pressure applied to the brake pedal 7 to an extent which is interpreted that the driver has no intention of applying braking. Specifically, the above determination is Made based on the fact, as being the restart conditions based on brake pressure, that the brake pressure has become equal to or less than a release threshold which is smaller than the first and second thresholds.

When an affirmative determination is made in step 340, the brake is expected to be released and thus control proceeds to step 350 without performing ABS control to perform a restart allowance process in preparation for the possible start of the vehicle. Thus, a start request is outputted from the engine ECU 20 to the starter 1a, so that the engine 1 is restarted, When a negative determination is made in step 340, control proceeds to step 360 where it is determined whether or not a restart request based on a matter other than brake pressure has been made. The "restart request based on a matter other than brake pressure" refers to such a start request as an AT pump start request. When there is such a restart request based on a matter other than brake pressure, control again proceeds to step 350 to perform the restart allowance process. Thus, a start request is outputted from the engine ECU 20 to the starter 1a, so that the engine 1 is restarted. Thus, the process in an engine stopped state is completed.

Figure 5:
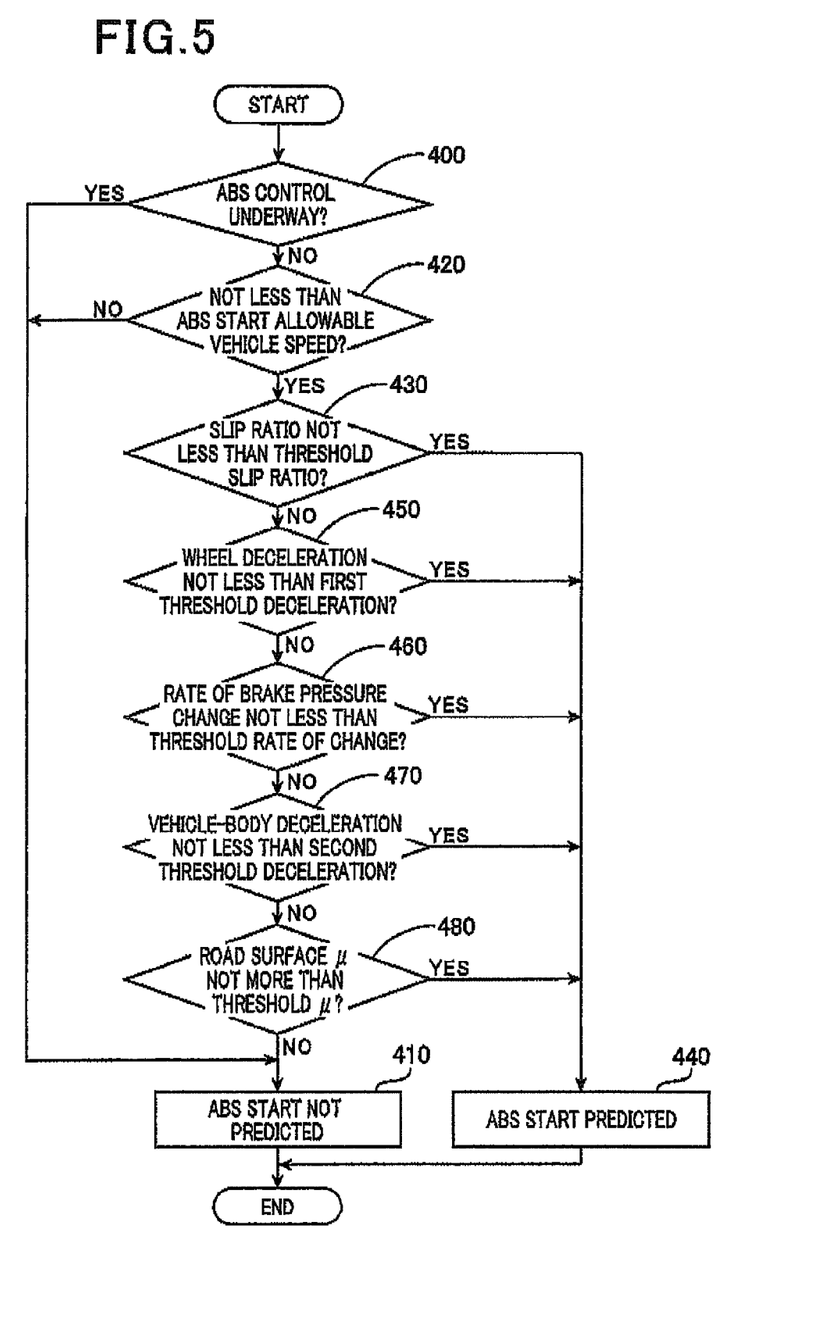
FIG. 5 is a flow diagram specifically illustrating a process of making an ABS (anti-skid braking system) start prediction performed by a brake ECU.

Referring now to FIG. 5, hereinafter is described the ABS start prediction process which has been indicated in step 260 of FIG. 3. FIG. 5 is a flow diagram specifically illustrating the ABS start prediction process. The process shown in FIG. 5, which is different from the flow of an IS control process, is performed by the brake ECU 40 at a predetermined control cycle.

In step 400, it is determined whether or not ABS control is underway, This determination is made in a similar way to step 250 of FIG. 3 described above. If an affirmative determination is made in step 400, control proceeds to step 410 to set that ABS start has not been predicted and then the present process is ended. In this regard, in the process in an engine operated state, the engine stop inhibition process is performed following the affirmative determination made in step 250. Also, in the process in an engine stopped state, the restart inhibition process is performed following the affirmative determination made in step 310. Therefore, engine stop or restart is prevented when ABS control is underway.

On the other hand, when a negative determination is made in step 400, control proceeds to step 420 to determine whether or not the vehicle speed is equal to or more than a vehicle speed for allowing start of ABS control (hereinafter referred to as "ABS start allowable vehicle speed"). In making this determination, the vehicle speed calculated based on the wheel speed is compared with the ABS start allowable vehicle speed, the wheel speed being obtained from a detection signal of each of wheel speed sensors 14FR, 14FL, 14RR and 14RL.

The ABS start allowable vehicle speed here is set to an upper limit of a low-speed range, at which ABS control is not required to be performed, e.g. a vehicle speed of about several kilometers per hour. A program is configured such that ABS control will not be performed at a vehicle speed less than the ABS start allowable vehicle speed. Accordingly, when the vehicle speed is determined to be less than the ABS start allowable vehicle speed, there is no possibility that ABS control is performed. Therefore, when a negative determination is made in step 420, control proceeds to step 410 to set that ABS start has not been predicted, as mentioned above, to thereby end the present process. When an affirmative determination is made in step 420, control proceeds to step 430.

In step 430, it is determined whether or not a slip ratio is equal to or more than a threshold slip ratio set in advance. In making this determination, a slip ratio is calculated, as mentioned above, by dividing the difference between the vehicle speed and each wheel speed by the vehicle speed to compare the resultant slip ratio with the threshold slip ratio. The threshold slip ratio here is slightly smaller than an ABS control start threshold, and thus is set to a high slip ratio of a level at which ABS control is started. Accordingly, when an affirmative determination is made in step 430, control proceeds to step 440 to set that ABA start has been predicted to thereby end the present process.

In this case, a signal indicating that ABS start has been predicted is outputted from the brake ECU 40 to the engine ECU 20. When the engine ECU 20 acquires this signal, the ABS start-predicted flag provided in the engine ECU 20 is set up. Thus, when the ABS start-predicted flag is set up, an affirmative determination is made, when the engine ECU 20 predicts the probability of ABS start in step 260 of FIG. 3.

When a negative determination is made in step 430, control proceeds to step 450. In step 450, it is determined whether or not wheel deceleration of any one of the wheels FR, FL, RR and RL is equal to or more than a first threshold deceleration set in advance. The first threshold deceleration is set to a value larger than a normal deceleration, that is, a value at which ABS control is predicted to be started, Accordingly, when an affirmative determination is made at step 450 as well, control proceeds to step 440 to set that the ABS start has been predicted to thereby end the present process, The first threshold deceleration may, for example, be a maximum deceleration that can be caused by the vehicle on a dry asphalt road surface, or may be determined based on the deceleration of the vehicle detected by the frontward/backward G sensor 41.

When a negative determination is made in step 450, control proceeds to step 460. In step 460, it is determined whether or not a rate of brake pressure change is equal to or more than threshold rate of change set in advance. As described above, the rate of brake pressure change is calculated by performing temporal differentiation of the M/C pressure detected by the pressure sensor 8a.

There is a high probability that ABS control is started when the rate of brake pressure change is large, as well. Therefore, a rate of brake pressure change of a level at which ABS control is predicted to be started is set as the threshold rate of change. When the rate of brake pressure change is equal to or more than the threshold rate of change, ABS control is predicted to be started. When an affirmative determination is made in step 460 as well, control proceeds to step 440 to set that ABS start has been predicted to thereby end the present process.

The threshold rate of change may be determined in a way similar to that of determining conditions for starting braking-assist control under which braking force is increased when emergency braking is applied. For example, the threshold rate of change may be determined based on the rate of brake pressure change at the time when the brake pedal 7 is pressed at a moving speed of 350 mm/s which is measured at a step-on surface of the brake pedal.

When a negative determination is made in step 460, control proceeds to step 470. In step 470, it is determined whether or not a vehicle-body deceleration is equal to or more than a second threshold deceleration. In making this determination, the vehicle deceleration obtained from the detection signal of the frontward/backward G sensor 41 is compared with the second threshold deceleration. The second threshold deceleration here refers to the vehicle-body deceleration at which ABS control is likely to be started.

Specifically, there is also a high probability of starting ABS control when the vehicle-body deceleration is relatively high. Therefore, a vehicle-body deceleration of a level at which ABS control is predicted to be started is set as the second threshold deceleration. When the vehicle-body deceleration is equal to or more than the second threshold deceleration, ABS control is started to be performed. When an affirmative determination is made in step 470 as well, control proceeds to step 440 to set that ABS start has been predicted to thereby end the present process.

For example, the second threshold deceleration may be set to 85% of the maximum deceleration caused by the vehicle on a dry asphalt road surface. Alternatively, the second threshold deceleration may be set such that the threshold is made smaller as the cornering limit is neared, while the forward movement of the vehicle is maximized (e.g., 85% of maximum deceleration).

When a negative determination is made in step 470, control proceeds to step 480. In step 480, it is determined whether or not the road surface μ (change of the friction coefficient of a road surface) is equal to or less than a threshold μ. As described above, the type of a road surface is identified based on an image picked up by the on-vehicle camera 42.

As the road surface μ is higher, the wheels are likely to skid, leading to higher probability of starting ABS control. Therefore, a value of the road surface μ of a level which is expected to have high probability of allowing ABS control is set as the threshold μ. When the road surface μ is equal to or less than the threshold μ, ABS control is predicted to be started.

When an affirmative determination is made in step 480 as well, control proceeds to step 440 to set that ABS start has been predicted to thereby end the present process. Thus, the ABS start prediction process is completed.

As described so far, in the present embodiment, it is so configured that idle stop is performed when brake pressure has become equal to or more than the first threshold, but that idle stop is inhibited when brake pressure has become equal to or more than the second threshold which is larger than the first threshold.

When idle stop is performed under the conditions where a brake pressure of equal to or more than the second threshold is applied, ABS control may be started following idle stop and may further be followed by restart of the engine 1. In such a case, in the present embodiment, controllability of ABS control is prevented from being deteriorated. By ensuring the controllability of ABS control, emergency braking is applied with good controllability of ABS control, causing higher braking force and further ensuring safety of the vehicle.

While the engine 1 is in operation and ABS control is underway, idle stop is inhibited, irrespective of whether or not brake pressure is equal to or more than the second threshold. Therefore, controllability of ABS control is ensured. The controllability would have otherwise been deteriorated due to the lowering of battery voltage which is caused by the restart of the engine 1 following idle stop in the midst of ABS control.

Further, when the engine 1 is in operation, idle stop is inhibited when the ABS start has been predicted, because ABS control is very likely to be performed when such a prediction is made. Therefore, controllability of ABS control is ensured. The controllability would have otherwise been deteriorated when ABS control is performed later.

On the contrary, it is so configured that, while the engine 1 is stopped, restart of the engine 1 is inhibited when ABS control is underway. Therefore, controllability of ABS control is ensured. The controllability would have otherwise been deteriorated due to the lowering of battery voltage which is caused by the restart of the engine 1 when ABS control is underway.

Further, while the engine 1 is stopped, restart of the engine 1 is ensured to be inhibited when ABS start has been predicted, because ABS control is very likely to be performed when such a determination is made. Therefore, controllability of ABS control is ensured. The controllability would have otherwise been deteriorated when ABS control is performed later.

(Modifications)

In the embodiment described above, idle stop has been inhibited when brake pressure has become equal to or more than the second threshold while the engine is in operation. Similarly, restart of the engine may be inhibited when brake pressure has become equal to or more than the second threshold while the engine is stopped.

For example, a step may be provided preceding step 340 of FIG. 4 to determine whether or not brake pressure is equal to or more than the second threshold. When an affirmative determination is made in this step, the restart inhibition process of step 320 may be performed. In this configuration as well, controllability of ABS control is ensured. The controllability would have otherwise been deteriorated due to the lowering of battery voltage which is caused by restarting the engine 1.

In the embodiment described above, idle stop has been inhibited in the engine stop inhibition process in step 220 of FIG. 3. However, depending on the results of the determinations of steps 210 and 230 to 260, there is a probability that idle stop may immediately be allowed in the engine stop process of step 270.

Therefore, in the case where control has proceeded to the engine stop process after inhibition of idle stop in the engine stop inhibition process, elapsed time may be counted from the time when the control has proceeded to the engine stop process. Then, when such a situation continues as where control repeatedly proceeds to the engine stop process without proceeding to the engine stop inhibition process, idle stop may then be allowed to be performed for the first time as the engine stop process. Thus, by spending time for making a determination, unnecessary engine stop is suppressed from being performed by the proceeding of control from the idle stop inhibition to the idle stop allowance.

In the embodiment described above, fixed thresholds have been used for the ABS start prediction, Alternatively, however, these thresholds may be made variable according to the states of the vehicle. ABS control is likely to be performed as the vehicle speed becomes higher. Accordingly, the threshold slip ratio, the first and second threshold decelerations, the threshold rate of change, and the threshold described in steps 430 and 450 to 480 of FIG. 5 may be made smaller as the vehicle speed becomes higher.

Figure 6:
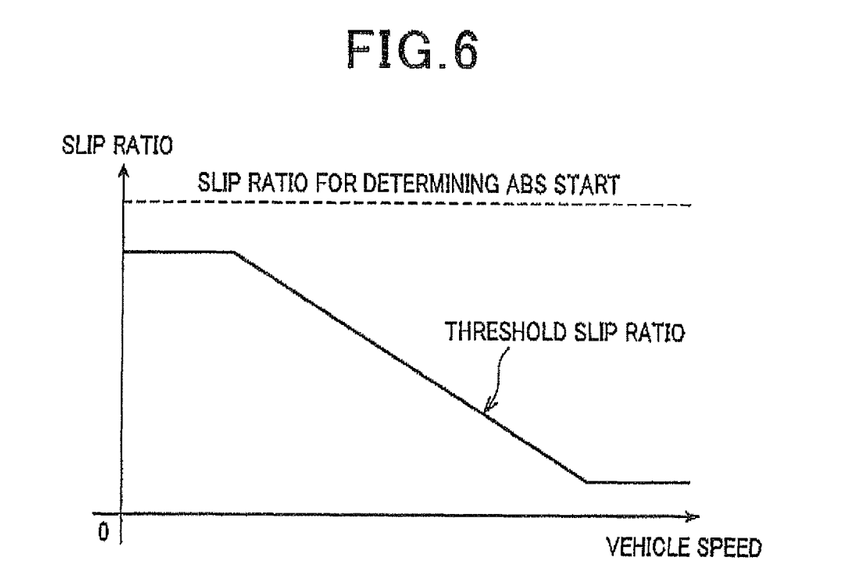
FIG. 6 is a map illustrating threshold slip ratio relative to vehicle speed.
Figure 7:
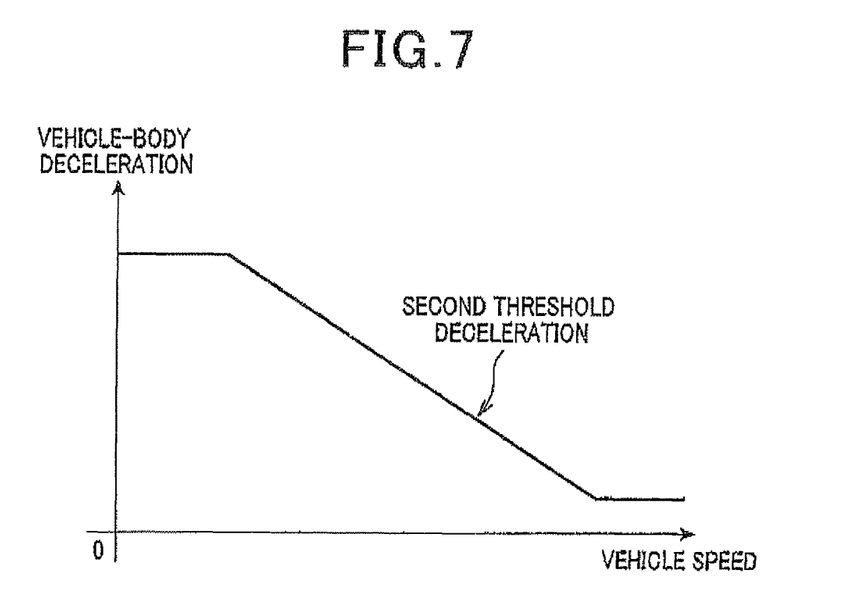
FIG. 7 is a map illustrating second threshold deceleration relative to vehicle speed.
Figure 8:
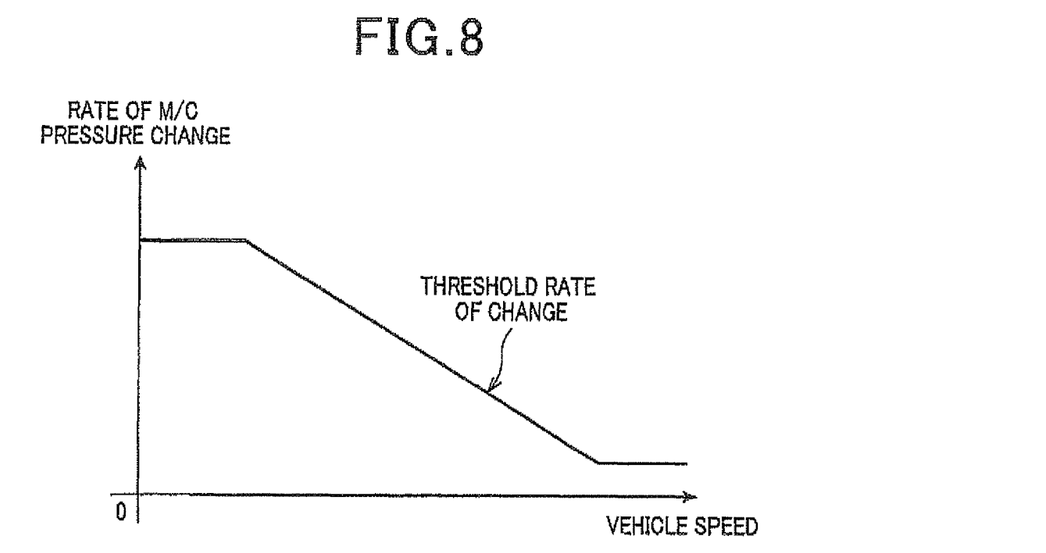
FIG. 8 is a map illustrating threshold rate of change relative to vehicle speed.

FIGS. 6 to 8 are maps illustrating the threshold slip ratio, the second threshold deceleration and the threshold rate of change, respectively, relative to the vehicle speed. As shown in these figures, the threshold slip ratio, the second threshold deceleration and the threshold rate of change may be made variable according to the vehicle speed, Specifically, the values of these items may be fixed when the vehicle speed is relatively low, made smaller as the vehicle speed becomes higher, and then be fixed when the vehicle speed has become equal to or more than a predetermined value.

Figure 9:
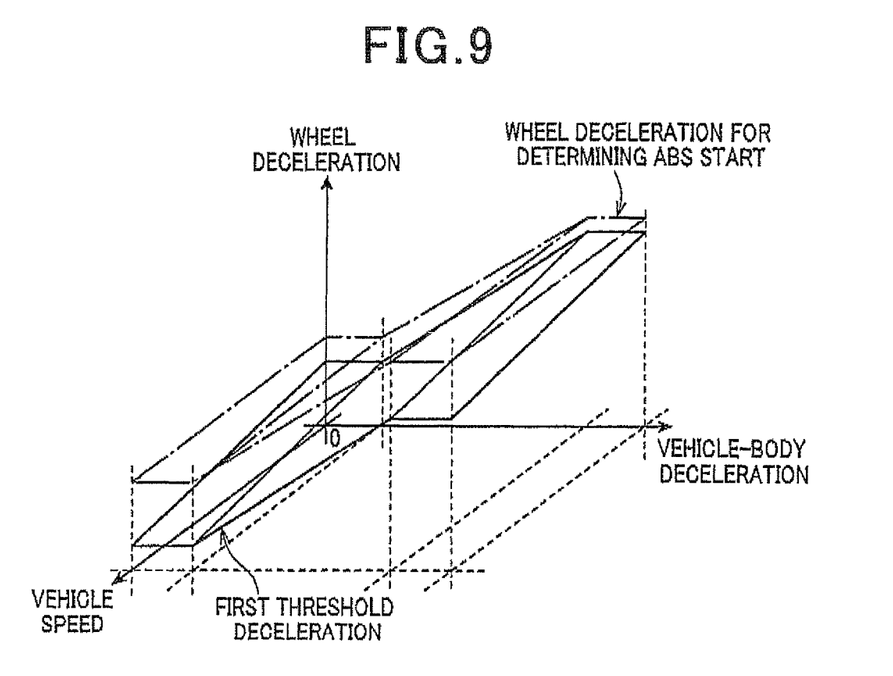
FIG. 9 is a map illustrating first threshold deceleration relative to vehicle speed and vehicle-body deceleration.

The same applies to the first deceleration, which, however, may additionally be made variable according to the vehicle-body deceleration. FIG. 9 is a map illustrating the first threshold deceleration relative to the vehicle speed and the vehicle-body deceleration. As indicated by the solid line in the figure, a relationship may be established in which the first threshold deceleration may be lowered as the vehicle speed becomes higher, while the first threshold deceleration may be raised as the vehicle-body deceleration is raised. In this case, for example, as shown in the figure, the first threshold deceleration may be fixed while the vehicle-body deceleration is relatively small, may be raised thereafter as the vehicle-body deceleration is raised, and then may be fixed when the vehicle-body deceleration has become equal to or more than a predetermined value.

The steps shown in the drawings correspond to respective means for performing processes. For example, the component that performs the processing of steps 100 to 300 corresponds to the automatic stop and restart control means. The component that performs the processing of step 220 corresponds to the stop inhibiting means. The components that perform the processing of steps 230 and 240 correspond to the first and second determining means, respectively. The component that performs the processing of steps 250 and 310 corresponds to the underway-control determining means. The component that performs the processing of steps 260 and 330 corresponds to the control prediction determining means. The component that performs the processing of step 270 corresponds to the stop allowing means.

In the embodiment described above, the functioning components that perform various processes have been disposed in the engine ECU 20 and the brake ECU 40. However, these functioning components may all be disposed in the engine ECU 20. Alternatively, an ECU for performing IS control may be provided separately from the engine ECU 20 and the functioning components may all be disposed in this separately provided ECU. As a matter of course, the functioning components may be scattered to a plurality of ECUs, because an in-vehicle LAN enables transmission and reception of various data.

Hereinafter, aspects of the above-described embodiments will be summarized.

As an aspect of the embodiment, an apparatus for controlling automatic stop and restart of an engine of a vehicle, includes: an automatic stop and restart control unit (100-300) which stops and restarts the engine (1); a brake pressure detection unit which detects brake pressure in a brake system, which generates the brake pressure in response to brake manipulation to cause a braking force for wheels, and controls the brake pressure to perform anti-skid control; a first determination unit (230) which determines whether or not the brake pressure detected by the brake pressure detection unit is equal to or more than a first threshold; a second determination unit (240) which determines whether or not the brake pressure detected by the brake pressure detection unit is equal to or more than a second threshold which is larger than the first threshold; a stop allowing unit (270) which allows the automatic stop and restart control unit to stop the engine (1) while the engine (1) is in operation, when the first determination unit (230) determines that the brake pressure is equal to or more than the first threshold and the second determination unit (240) determines that the brake pressure is less than the second threshold; and a stop inhibiting unit (220) which inhibits the automatic stop and restart control unit from stopping the engine (1) while the engine (1) is in operation, when the first determination unit (230) determines that the brake pressure is less than the first threshold and the second determination unit (240) determines that the brake pressure is equal to or more than the second threshold.

Thus, when brake pressure has become equal to or more than the first threshold, the engine stop is ensured to be allowed. Also, when brake pressure has become equal to or more than the second threshold which is larger than the first threshold, the engine stop is ensured to be inhibited.

When the engine (1) is stopped under the conditions where a brake pressure of equal to or more than the second threshold is applied, ABS control may be started following the engine stop and may further be followed by restart of the engine (1), In such a case, in the present embodiment, controllability of ABS is prevented from being deteriorated, The apparatus further includes an underway-control determining unit (250) which determines whether or not it is in the midst of the anti-skid control while the engine (1) is in operation. The stop inhibiting unit (220) inhibits the stop of the engine (1) while the engine (1) is in operation, when the underway-control determining unit (250) determines that it is in the midst of the anti-skid control.

Thus, it is ensured that engine stop is inhibited while ABS control is performed as well, irrespective of whether or not the brake pressure is equal to or more than the second threshold. Therefore, controllability of ABS control is ensured. The controllability would have otherwise been deteriorated due to the lowering of battery voltage, which is caused by the restart of the engine (1) following the engine stop in the midst of ABS control, The apparatus further includes a control prediction determining unit (260) which determines whether or not it is predicted that the anti-skid control is performed while the engine (1) is in operation, The stop inhibiting unit (220) inhibits the stop of the engine (1) while the engine (1) is in operation, when the control prediction determining unit (260) determines that it is predicted that the anti-skid control is performed.

Thus, when ABS control is predicted to be performed (ABS start prediction) as well, the probability of performing ABS control will be relatively high and thus it is ensured that engine stop is inhibited. Accordingly, controllability of ABS control is ensured in such a case as well. The controllability would have otherwise been deteriorated by performing the ABS control later.

The apparatus further includes an underway-control determining unit (310) which determines whether or not it is in the midst of the anti-skid control while the engine (1) is stopped, and a restart inhibiting unit (320) which inhibits the restart by the automatic stop and restart control unit (100-300) while the engine (1) is stopped, when the underway-control determining unit (310) determines that it is in the midst of the anti-skid control.

Thus, when it is determined, while the engine (1) is stopped, that ABS control is underway, restart of the engine (1) is inhibited. Accordingly, controllability of ABS control is ensured. The controllability would have otherwise been deteriorated by the lowering of battery voltage, which is caused by the restart of the engine (1) while ABS control is performed.

In the apparatus, the restart inhibiting unit (320) inhibits the restart by the automatic stop and restart control unit (100-300) while the engine (1) is stopped, when the second determination unit (240) determines that the brake pressure is equal to or more than the second threshold.

Thus, when brake pressure has become equal to or more than the second threshold, as well, while the engine (1) is stopped, restart of the engine (1) is inhibited, Accordingly, controllability of ABS control is ensured. The controllability would have otherwise been deteriorated by the lowering of battery voltage, which is caused by the restart of the engine (1).

The apparatus further includes a control prediction determining unit (330) which determines whether or not it is predicted that the anti-skid control is performed while the engine (1) is stopped. The restart inhibiting unit (320) inhibits the restart of the engine (1) while the engine (1) is stopped, when the control prediction determining unit (330) determines that it is predicted that the anti-skid control is performed.

Thus, when ABS start is predicted to be performed while the engine (1) is stopped, as well, the probability of performing ABS control will be relatively high, and thus it is ensured that restart of the engine (1) is inhibited. Accordingly, controllability of ABS control is ensured in such a case as well. The controllability would have otherwise been deteriorated by performing ABS control later.

In the apparatus, the control prediction determining unit (260, 330) includes a unit (430) which determines that it is predicted that the anti-skid control is performed when a slip ratio of a wheel at the time when the vehicle is decelerated is equal to or more than a threshold slip ratio.

In the apparatus, the control prediction determining unit (260, 330) includes a unit (450) which determines that it is predicted that the anti-skid control is performed when wheel deceleration at the time when the vehicle is decelerated is equal to or more than a first threshold deceleration.

In the apparatus, the control prediction determining unit (260, 330) includes a unit (460) which determines that it is predicted that the anti-skid control is performed when a rate of brake pressure change at the time when the vehicle is decelerated is equal to or more than a threshold rate of change.

In the apparatus, the control prediction determining unit (260, 330) includes a unit (470) which determines that it is predicted that the anti-skid control is performed when vehicle-body deceleration at the time when the vehicle is decelerated is equal to or more than a second threshold deceleration.

In the apparatus, the control prediction determining unit (260, 330) includes a unit (480) which determines that it is predicted that the anti-skid control is performed when a friction coefficient of a road surface at the time when the vehicle is decelerated is equal to or less than a threshold.

It will be appreciated that the present invention is not limited to the configurations described above, but any and all modifications, variations or equivalents, which may occur to those who are skilled in the art, should be considered to fall within the scope of the present invention.

What is claimed is:

1. An apparatus for controlling automatic stop and restart of an engine of a vehicle, comprising:
   an automatic stop and restart control unit which stops and restarts the engine;
   a brake pressure detection unit which detects brake pressure in a brake system, the brake system generating the brake pressure in response to brake manipulation to cause a braking force for wheels, and the brake system controlling the brake pressure to perform anti-skid control;
   a first determination unit which determines whether or not the brake pressure detected by the brake pressure detection unit is equal to or more than a first threshold;
   a second determination unit which determines whether or not the brake pressure detected by the brake pressure detection unit is equal to or more than a second threshold which is larger than the first threshold;
   a stop allowing unit which allows the automatic stop and restart control unit to stop the engine while the engine is in operation, when the first determination unit determines that the brake pressure is equal to or more than the first threshold and the second determination unit determines that the brake pressure is less than the second threshold; and
   a stop inhibiting unit which inhibits the automatic stop and restart control unit from stopping the engine while the engine is in operation, when the first determination unit determines that the brake pressure is less than the first threshold or the second determination unit determines that the brake pressure is equal to or more than the second threshold.

2. The apparatus according to claim 1, further comprising an underway-control determining unit which determines whether or not the anti-skid control is being performed while the engine is in operation, wherein
   the stop inhibiting unit inhibits the stop of the engine while the engine is in operation, when the underway-control determining unit determines that the anti-skid control is being performed.

3. The apparatus according to claim 1, further comprising a control prediction determining unit which determines whether or not performing the anti-skid control is predicted while the engine is in operation, wherein
   the stop inhibiting unit inhibits the stop of the engine while the engine is in operation, when the control prediction determining unit determines that performing the anti-skid control is predicted.

4. The apparatus according to claim 3, wherein
   the control prediction determining unit includes a unit which determines that performing the anti-skid control is predicted when a slip ratio of at least one of the wheels at a time when the vehicle is decelerated is equal to or more than a threshold slip ratio.

5. The apparatus according to claim 3, wherein
   the control prediction determining unit includes a unit which determines that performing the anti-skid control is predicted when a wheel deceleration at a time when the vehicle is decelerated is equal to or more than a first threshold deceleration.

6. The apparatus according to claim 3, wherein
   the control prediction determining unit includes a unit which determines that performing the anti-skid control is predicted when a rate of brake pressure change at a time when the vehicle is decelerated is equal to or more than a threshold rate of change.

7. The apparatus according to claim 3, wherein
   the control prediction determining unit includes a unit which determines that performing the anti-skid control is predicted when a vehicle-body deceleration at a time when the vehicle is decelerated is equal to or more than a second threshold deceleration.

8. The apparatus according to claim 3, wherein
   the control prediction determining unit includes a unit which determines that performing the anti-skid control is predicted when a friction coefficient of a road surface at a time when the vehicle is decelerated is equal to or less than a third threshold.

9. The apparatus according to claim 1, further comprising:
   an underway-control determining unit which determines whether or not the anti-skid control is being performed while the engine is stopped, and a restart inhibiting unit which inhibits the restart by the automatic stop and restart control unit while the engine is stopped, when the underway-control determining unit determines that the anti-skid control is being performed.

10. The apparatus according to claim 9, wherein
the restart inhibiting unit inhibits the restart by the automatic stop and restart control unit while the engine is stopped, when the second determination unit determines that the brake pressure is equal to or more than the second threshold.

11. The apparatus according to claim 9, further comprising
a control prediction determining unit which determines whether or not performing the anti-skid control is predicted while the engine is stopped, wherein
the restart inhibiting unit inhibits the restart of the engine while the engine is stopped, when the control prediction determining unit determines that performing the anti-skid control is predicted.

* * * * *